United States Patent
Li et al.

(10) Patent No.: US 12,556,319 B2
(45) Date of Patent: Feb. 17, 2026

(54) PROTOCOL DATA UNIT GENERATION METHOD, CONFIGURATION METHOD, APPARATUS, AND ELECTRONIC DEVICE

(71) Applicant: VIVO MOBILE COMMUNICATION CO., LTD., Guangdong (CN)

(72) Inventors: Na Li, Guangdong (CN); Xueming Pan, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 597 days.

(21) Appl. No.: 17/980,381

(22) Filed: Nov. 3, 2022

(65) Prior Publication Data
US 2023/0062421 A1    Mar. 2, 2023

Related U.S. Application Data

(63) Continuation of application No. PCT/CN2021/093016, filed on May 11, 2021.

(30) Foreign Application Priority Data

May 12, 2020 (CN) .......................... 202010399508.9

(51) Int. Cl.
*H04L 1/18* (2023.01)
*H04L 1/1867* (2023.01)
(Continued)

(52) U.S. Cl.
CPC ........... *H04L 1/1887* (2013.01); *H04W 72/23* (2023.01)

(58) Field of Classification Search
CPC ................ H04L 1/1887; H04L 1/1664; H04L 1/1861; H04L 1/1864; H04L 1/189; H04L 1/1812;
(Continued)

(56) References Cited

U.S. PATENT DOCUMENTS 10,524,232 B2 *  12/2019  Lee ..................... H04W 76/38
2018/0160445 A1  6/2018  Babaei et al.
(Continued)

FOREIGN PATENT DOCUMENTS

WO    2018186137 A1    10/2018
WO    2020026292 A1    2/2020
WO    2020040179 A1    2/2020

OTHER PUBLICATIONS

Extended European Search Report for Application No. 21805002.9, dated Sep. 14, 2023, 8 Pages.
Vivo "On the misalignment between RAN1 and RAN2 about UL skipping" 3GPP TSG RAN WG1 #100, e-Meeting, Feb. 2020, R1-2000298, 3 Pages.
(Continued)

*Primary Examiner* — Candal Elpenord
(74) *Attorney, Agent, or Firm* — BROOKS KUSHMAN P.C.

(57) ABSTRACT

A protocol data unit generation method, a configuration method, an apparatus, and an electronic device are disclosed. The protocol data unit generation method is applied to a terminal, and the method includes: generating, by a media access control MAC entity of the terminal, a MAC protocol data unit PDU for a currently scheduled hybrid automatic repeat request HARQ entity according to at least one of the following: first indication information sent by a network-side device, second indication information sent by a physical layer entity to the MAC entity, and a configuration of the terminal; and sending, by the MAC entity, the generated MAC PDU to the physical layer entity.

14 Claims, 10 Drawing Sheets

A media access control MAC entity of a terminal generates a MAC protocol data unit PDU for a currently scheduled hybrid automatic repeat request HARQ entity according to at least one of the following: first indication information sent by a network-side device, second indication information sent by a physical layer entity to the MAC entity, and a configuration of the terminal — 101

The MAC entity sends the generated MAC PDU to the physical layer entity — 102

(51) Int. Cl.
*H04W 72/14* (2009.01)
*H04W 72/23* (2023.01)

(58) Field of Classification Search
CPC ............. H04W 72/23; H04W 72/1268; H04W 72/232; H04W 72/21; H04W 80/02; H04W 28/06
USPC .................................................. 370/329–330
See application file for complete search history.

(56) References Cited

U.S. PATENT DOCUMENTS

| | | | | |
|---|---|---|---|---|
| 2020/0404691 | A1* | 12/2020 | Wu ........................ | H04W 76/15 |
| 2021/0029706 | A1* | 1/2021 | Zhou ...................... | H04L 1/1854 |
| 2021/0204321 | A1* | 7/2021 | Babaei ................... | H04L 1/1835 |
| 2021/0259006 | A1 | 8/2021 | Yoshioka et al. | |
| 2021/0329682 | A1 | 10/2021 | Takeda et al. | |
| 2021/0360685 | A1* | 11/2021 | Huang ................. | H04B 7/0697 |
| 2021/0400515 | A1* | 12/2021 | Kim ....................... | H04W 24/10 |
| 2022/0232619 | A1* | 7/2022 | Fu ........................... | H04L 1/08 |
| 2023/0209554 | A1* | 6/2023 | Kuo ....................... | H04W 72/23 |
| | | | | 370/329 |

OTHER PUBLICATIONS

First Office Action for Japanese Application No. 2022-568946, dated Nov. 2, 2023, 8 Pages.
Vivov "Discussion on PUSCH skipping with overlapping UCI on PUCCH" 3GPP TSG RAN WG1 #101, e-Meeting, May 2020, R1-2003363, 2 Pages.
Vivo "Discussion on PUSCH skipping with overlapping UCI on Pucch" 3GPP TSG RAN WG1 #102-e, e-Meeting, Aug. 2020, R1-2005327, 7 Pages.
Vivo "Clarification on the uplink skipping" 3GPP TSG-RAN WG2 Meeting #108, Reno, USA, Nov. 2019, R2-1914958, 3 Pages.
International Search Report and Written Opinion for Application No. PCT/CN2021/093016, dated Aug. 11, 2021, 8 Pages.
Vivo. "Summary of email discussion [100e-5LS-02]", 3GPP TSG RAN WGJ #100, R1-2001293, Mar. 6, 2020.
ZTE Corporation et al. "CR to 38.321 on UCI transmission when the overlapping PUSCH transmission is skipped", 3GPP TSG-RAN WG2 Meeting #109 e-meeting BIS, R2-2003594, Apr. 30, 2020.
Ericsson et al. "Correction to test case 7.1.4.la for Layer 2 Latency Reduction", 3GPP TSG5 Ran meeting #79, R5-183061, May 25, 2018.

* cited by examiner

PROTOCOL DATA UNIT GENERATION METHOD, CONFIGURATION METHOD, APPARATUS, AND ELECTRONIC DEVICE

CROSS-REFERENCE TO RELATED APPLICATIONS

This application is a continuation of PCT International Application No. PCT/CN2021/093016 filed on May 11, 2021, which claims priority to Chinese Patent Application No. 202010399508.9, filed on May 12, 2020, which are incorporated herein by reference in their entireties.

TECHNICAL FIELD

This application relates to the field of communications technologies, and in particular, to a protocol data unit generation method, a configuration method, an apparatus, and an electronic device.

BACKGROUND

In a case that an uplink transmission skipping (UL skipping) function is enabled for an uplink data channel (PUSCH) of a terminal and there is no to-be-transmitted data in a data memory of the terminal, even if a base station schedules the terminal for data transmission, the UL skipping function allows the terminal to ignore scheduling of the base station and skip performing uplink transmission. However, in the foregoing scenario, when a resource collision occurs between an uplink control channel (PUCCH) and a dynamically scheduled uplink data channel, the terminal may choose: 1. to skip generating a PUSCH, and transmit uplink control information (UCI) on the PUCCH; or 2. to generate a PUSCH and multiplex uplink control information (UCI) onto the generated PUSCH for transmission. This increases complexity of blind detection on the network side and complexity of processing UCI multiplexing by the terminal.

SUMMARY

According to a first aspect, an embodiment of this application provides a protocol data unit generation method, applied to a terminal, where the method includes:
  generating, by a media access control MAC entity of the terminal, a MAC protocol data unit PDU for a currently scheduled hybrid automatic repeat request HARQ entity according to at least one of the following: first indication information sent by a network-side device, second indication information sent by a physical layer entity to the MAC entity, or a configuration of the terminal; and
  sending, by the MAC entity, the generated MAC PDU to the physical layer entity.

According to a second aspect, an embodiment of this application provides a configuration method for protocol data unit generation, applied to a network-side device, where the method includes:
  sending first indication information to a terminal, so as to indicate that a media access control MAC entity of the terminal generates a MAC protocol data unit PDU for a currently scheduled hybrid automatic repeat request HARQ entity.

According to a third aspect, an embodiment of this application provides a protocol data unit generation apparatus, applied to a terminal, where the apparatus includes:
  a generating module, configured to generate a MAC protocol data unit PDU for a currently scheduled hybrid automatic repeat request HARQ entity according to at least one of the following: first indication information sent by a network-side device, second indication information sent by a physical layer entity to the MAC entity, or a configuration of the terminal; and
  a sending module, configured to send the generated MAC PDU to the physical layer entity.

According to a fourth aspect, an embodiment of this application further provides a configuration apparatus for protocol data unit generation, applied to a network-side device, where the apparatus includes:
  an indicating module, configured to send first indication information to a terminal, so as to indicate that a media access control MAC entity of the terminal generates a MAC protocol data unit PDU for a currently scheduled hybrid automatic repeat request HARQ entity.

According to a fifth aspect, an embodiment of this application further provides an electronic device, including a processor, a memory, and a program or an instruction stored in the memory and capable of running on the processor, and when the program or the instruction is executed by the processor, the steps of the method described above are implemented.

According to a sixth aspect, an embodiment of this application further provides a readable storage medium, where a program or an instruction is stored in the readable storage medium, and when the program or the instruction is executed by a processor, the steps of the method described above are implemented.

According to a seventh aspect, an embodiment of this application provides a chip, where the chip includes a processor and a communications interface, the communications interface is coupled to the processor, and the processor is configured to run a program or an instruction to implement the methods according to the first aspect and the second aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION

Figure 1:
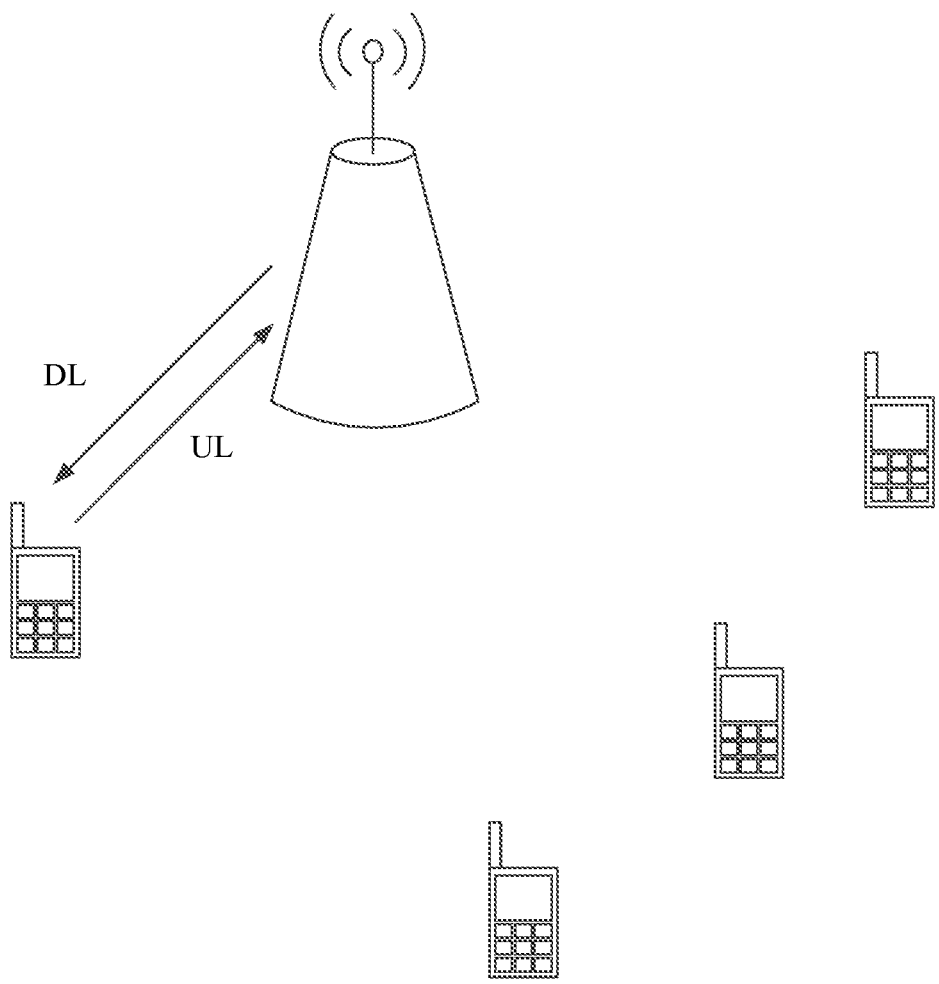
FIG. 1 is a schematic diagram of a wireless communications system.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system can implement radio technologies such as CDMA2000 and Universal Terrestrial Radio Access (UTRA). The UTRA includes wideband CDMA (Wideband Code Division Multiple Access, WCDMA) and other CDMA variants. The TDMA system can implement radio technologies such as the global system for mobile communications (GSM). The OFDMA system can implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the methods described may be performed in an order different from that described, and steps may alternatively be added, omitted, or combined. In addition, features described with reference to some examples may be combined in other examples.

Referring to FIG. 1, FIG. 1 is a schematic diagram of a wireless communications system to which the embodiments of this application are applicable. The wireless communications system includes a terminal 11 and a network device 12. The terminal 11 may also be referred to as a terminal device or a user terminal (User Equipment, UE). The terminal 11 may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal 11 is not limited in the embodiments of this application. The network-side device 12 may be a base station or a core network. The base station may be a 5G base station and a base station of a later version (for example, a gNB or a 5G NR NB), or a base station in another communications system (for example, an eNB, a WLAN access point, or another access point), or a location server (for example, an E-SMLC or an LMF (Location Manager Function)). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. Provided that a same technical effect is achieved, the base station is not limited to a specific technical term. It should be noted that in the embodiments of this application, the base station in the NR system is merely used as an example, and a specific type of the base station and a specific communications system are not limited.

Figure 2:
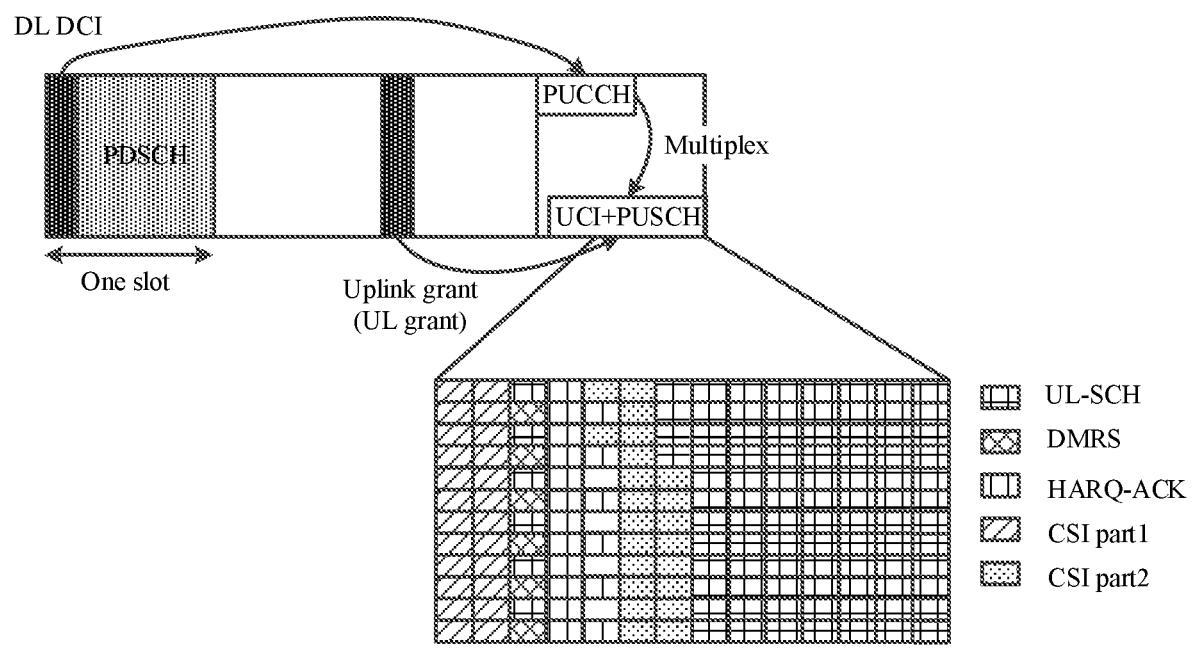
FIG. 2 is a schematic diagram of UCI multiplexing on PUSCH.

Uplink control information (UCI) is transmitted on an uplink control channel (Physical Uplink Control Channel, PUCCH). If the terminal is transmitting data on an uplink data channel (Physical Uplink Shared Channel, PUSCH), in principle, the PUCCH and the PUSCH can be sent at the same time, that is, the UCI remains on the PUCCH. However, this may increase cubic metric. In addition, if requirements of out-of-band transmission need to be met at a higher transmit power, and the PUSCH and the PUCCH have a large interval in between when being simultaneously transmitted (the PUCCH is generally transmitted at both ends of a frequency band), challenges are posed for implementation of radio frequency (RF). Therefore, in general cases, if a PUCCH resource for transmitting UCI overlaps a PUSCH resource in time, and during scheduling of the PUSCH, a base station ensures that a condition of a UCI multiplexing processing time is satisfied. As shown in FIG. 2, the UCI is multiplexed with data on the PUSCH to avoid performing PUCCH transmission at the same time. DL DCI represents downlink control information, PDSCH represents a physical downlink shared channel, one slot is one time slot, UL grant represents an uplink grant, multiplex is multiplexing, UL-SCH represents an uplink shared channel, DMRS represents a demodulation reference signal, HARQ-ACK represents a hybrid automatic repeat request-acknowledgement, CSI part1 represents the first part of channel state information, and CSI part2 represents the second part of channel state information.

Figure 3:
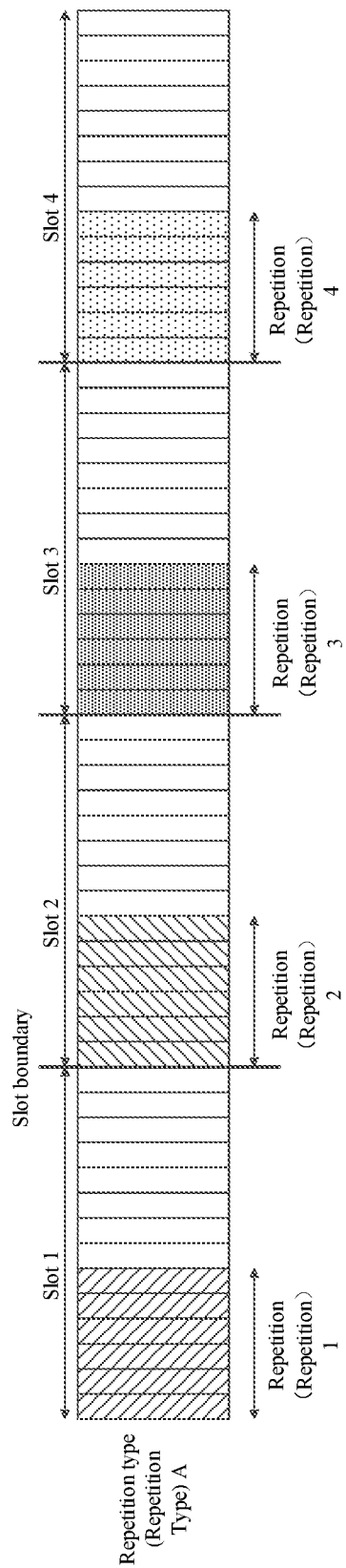
FIG. 3 is a schematic diagram of PUSCH repetition Type A.

In related communications protocols, repetition transmission is based on slot. K repetition transmissions need to occupy K slots, and time resources (a start position of transmission) occupied by data transmission in each slot are the same. A mechanism of such repetition transmission is referred to as PUSCH repetition Type A, as shown in FIG. 3, where slot boundary represents a time slot boundary.

Figure 4:
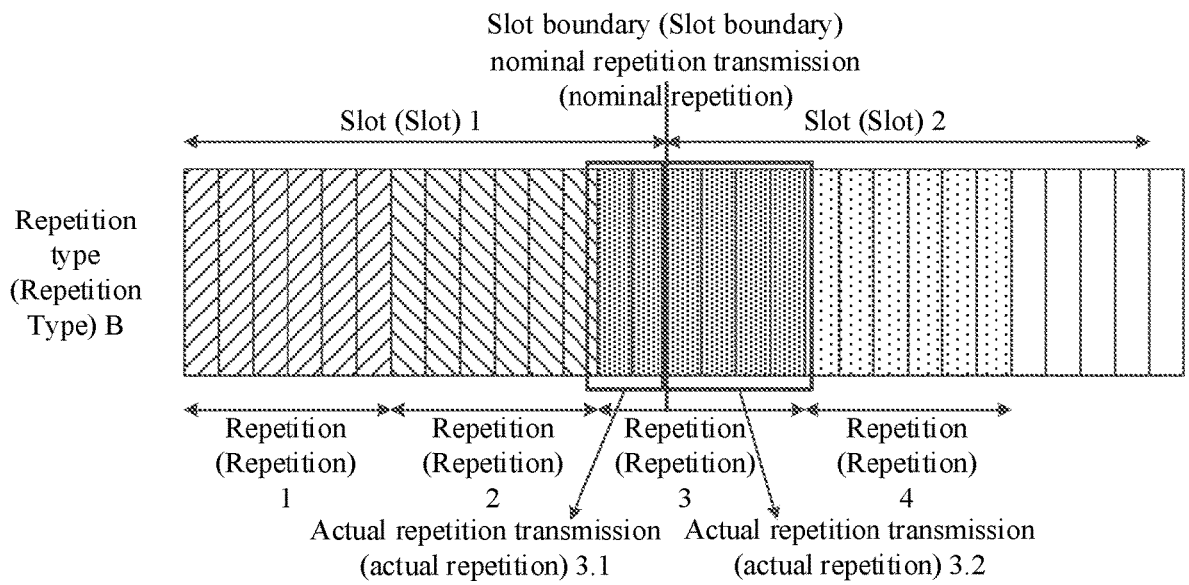
FIG. 4 is a schematic diagram of PUSCH repetition Type B.

Some communications protocols introduce per-subslot (sub-slot) repetition transmission, and K nominal repetition transmissions (nominal repetition) can be continuously performed in a "back-to-back" manner in one slot. When time-domain resources for nominal transmission need to cross a slot boundary, or an invalid or unavailable resource or symbol, for example, a downlink symbol, is included in the time-domain resources, the nominal transmission may be divided into a plurality of actual repetition transmissions (actual repetition) by the slots or the invalid resource or symbol. A mechanism of such repetition transmission is referred to as PUSCH repetition Type B, as shown in FIG. 4.

Figure 5:
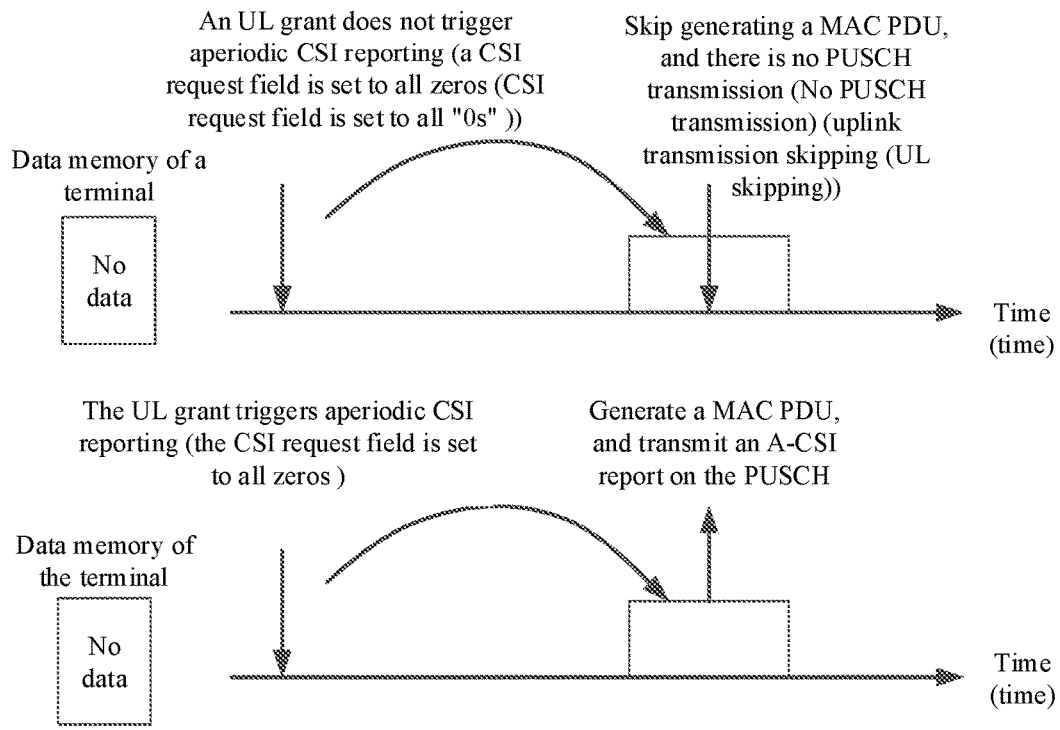
FIG. 5 is a schematic diagram of UL skipping conditions.

In some communications protocols, an uplink skipping (UL skipping) procedure implemented by the terminal is defined for a media access control (MAC) layer. FIG. 5 is a schematic diagram of UL skipping conditions. A MAC entity may not generate a MAC protocol data unit (PPDU) for a HARQ entity if the following conditions are satisfied:

(1) a parameter skipUplinkTxDynamic is configured for the MAC entity, a value of this parameter is set to true, and the MAC successfully locates a HARQ entity indicated in an uplink grant (UL grant);
(2) the UL grant includes no request for aperiodic CSI for this PUSCH transmission as specified in related communications protocols;
(3) a MAC PDU includes zero MAC service data units (Service Data Unit, SDU); and
(4) the MAC PDU includes only a periodic buffer status report (Buffer Status Report, BSR) and there is no data available for any logical channel group (Logical Channel Group, LCG), or the MAC PDU includes only a padding BSR.

When an uplink transmission skipping (UL skipping) function is enabled for the uplink data channel (PUSCH) of the terminal and there is no to-be-transmitted data in a data memory of the terminal, even if the base station schedules the user for data transmission, the UL skipping function allows the user to ignore scheduling of the base station and skip performing uplink transmission. However, in the foregoing scenario, when a resource collision is present between the uplink control channel (PUCCH) and a dynamically scheduled uplink data channel, the terminal may choose:

1. to skip generating a PUSCH, and transmit uplink control information (UCI) on the PUCCH; or
2. to generate a PUSCH and make uplink control information (UCI) multiplexed on the generated PUSCH for transmission.

If no MAC PDU is generated to support UCI multiplexing on the PUSCH, the following problems may occur: (1) Complexity of blind detection on the network side is increased, because the network side needs to blindly detect whether UCI is sent on the PUCCH or sent on the PUSCH, and a probability of sending UCI on the PUCCH due to UL skipping is much greater than that due to missing of the UL grant. (2) Complexity of processing UCI multiplexing by the terminal is increased. According to existing communications protocols, a condition for UCI multiplexing on the PUSCH by the terminal is resource overlapping between the PUCCH and the PUSCH, without considering UL skipping. An additional judgment of whether the terminal generates a MAC PDU means that the terminal needs to check another condition in addition to resource overlapping, which then introduces a new behavior, thereby increasing complexity of processing UCI multiplexing by the user.

In addition, in an existing MAC layer protocol, because resource overlapping between the physical layer PUCCH and PUSCH is not visible to the MAC layer, the MAC layer is unable to determine whether a MAC PDU needs to be generated in a case that there is no data in a data memory of the terminal and UL skipping is enabled.

The embodiments of this application provide a protocol data unit generation method, a configuration method, an apparatus, and an electronic device, so that a MAC entity generates a MAC PDU and delivers the generated MAC PDU to a physical layer entity (the MAC PDU becomes a PUSCH), to support UCI multiplexing on the PUSCH.

Figures 6, 7:
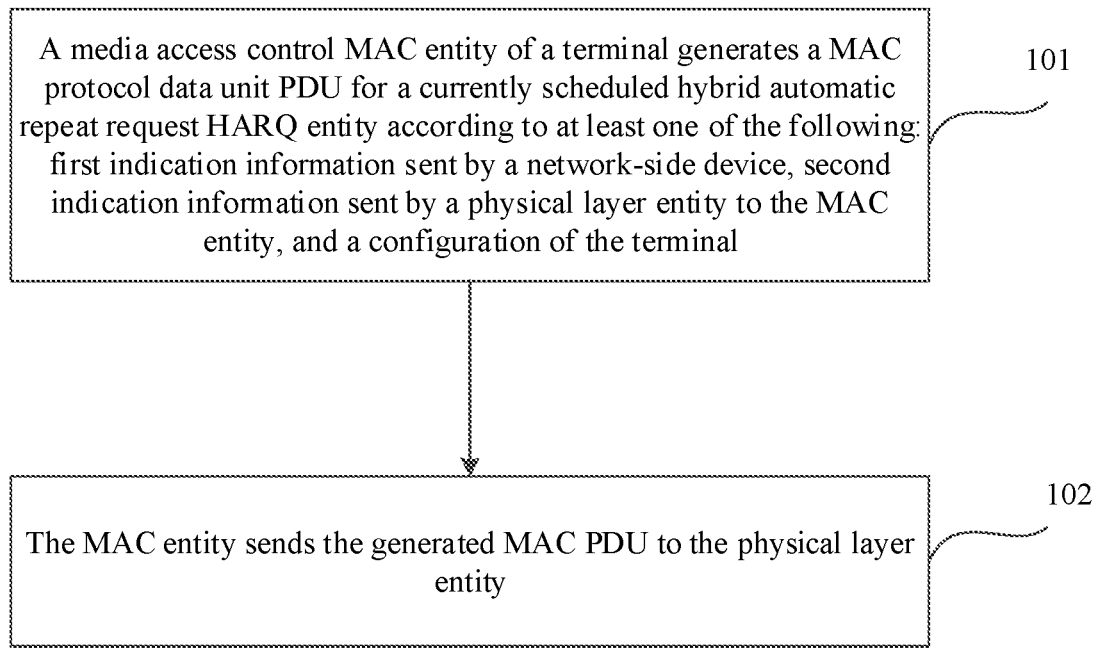
FIG. 6 is a schematic flowchart of a protocol data unit generation method according to an embodiment of this application.
FIG. 7 is a schematic flowchart of a configuration method for protocol data unit generation according to an embodiment of this application.

An embodiment of this application provides a protocol data unit generation method, applied to a terminal. As shown in FIG. 6, the method includes:

Step 101: A media access control MAC entity of the terminal generates a MAC protocol data unit PDU for a currently scheduled hybrid automatic repeat request HARQ entity according to at least one of the following: first indication information sent by a network-side device, second indication information sent by a physical layer entity to the MAC entity, or a configuration of the terminal.

Step 102: The MAC entity sends the generated MAC PDU to the physical layer entity.

In this embodiment of this application, the MAC entity of the terminal may generate a MAC PDU for the currently scheduled HARQ entity according to at least one of the following: the first indication information sent by the network-side device, the second indication information sent by the physical layer entity to the MAC entity, or the configuration of the terminal. In this way, the terminal may be also caused to generate a data PDU at the MAC layer and deliver the data PDU to the physical layer in a case that there is no uplink data transmission for the terminal, so as to support uplink control information multiplexing on the MAC PDU, thereby reducing complexity of blind detection on the network side and reducing complexity of processing uplink control information multiplexing on an uplink data channel by the terminal.

The first indication information sent by the network-side device is dynamic scheduling information, and can clearly indicate under what conditions an UL-SCH is generated, or indicate whether to generate an UL-SCH, or indicate whether uplink data needs be generated regardless of whether the terminal has data or not. Generating the UL-SCH means generating a MAC PDU by the MAC entity.

In some embodiments, the first indication information may be carried in an uplink grant message sent by the network-side device. For example, x bits (x is a natural number and may be equal to 1) are introduced into a DCI format(s), that is, the UL grant, and is used to indicate whether an UL-SCH (data) is generated for this PUSCH transmission.

In some embodiments, the first indication information occupies an independent first indication field in the uplink grant message; or
the first indication information and other indication information are jointly encoded to occupy a second indication field in the uplink grant message; or
the first indication information uses a third indication field, used for indicating other information, in the uplink grant message.

That is, the x bits may occupy an independent field in the UL grant, or may be jointly encoded with an existing field, or may use an existing field.

In an optional embodiment, the first indication information occupies an independent first indication field in the uplink grant message.

In a case that a value of the first indication field is a first value, it indicates that the MAC entity always generates a MAC PDU; and/or
in a case that a value of the first indication field is a second value, it indicates that the MAC entity skips generating a MAC PDU when the following conditions are satisfied: a value of a parameter skipUplinkTxDynamic configured by the MAC entity is set to true and the terminal satisfies a condition for uplink transmission skipping.

The independent first indication field may be a UCI multiplexing field with a size of 1 bit.

In an optional example, when a value of the UCI multiplexing field is 1, it indicates that the terminal always sends the UL-SCH on the PUSCH regardless of what conditions and scenarios; or when the value of the UCI multiplexing field is 0, it is a reserved value.

In another optional example, when a value of the UCI multiplexing field is 1, it indicates that the terminal always sends the UL-SCH on the PUSCH regardless of what conditions and scenarios; or when a value of the UCI multiplexing field is 0, it indicates that an UL-SCH is not generated when the following conditions are satisfied: skipUplinkTxDynamic is set to true and a condition for uplink transmission skipping (UL skipping) by the terminal is satisfied.

The condition for uplink transmission skipping to be implemented by the terminal includes all of the following:
the value of the parameter skipUplinkTxDynamic configured by the MAC entity is set to true, and the MAC entity successfully locates a HARQ entity indicated in the uplink grant message;
the uplink grant message does not trigger aperiodic CSI reporting;
a resource allocated by using the uplink grant message does not overlap that of to-be-transmitted uplink control signaling in time domain;
the MAC PDU includes 0 MAC service data units SDUs; and
the MAC PDU includes only a periodic buffer status report BSR and there is no data available for any logical channel group, or the MAC PDU includes only a padding BSR.

In another optional embodiment, the first indication information and other indication information are jointly encoded to occupy a second indication field in the uplink grant message.

In a case that a value of the second indication field is a third value, it indicates that the MAC entity generates a MAC PDU when a channel state information CSI request is not set to all zeros;
in a case that the value of the second indication field is a fourth value, it indicates that the MAC entity always generates a MAC PDU; and
in a case that the value of the second indication field is a fifth value, it indicates that the MAC entity skips generating a MAC PDU when a value of a parameter skipUplinkTxDynamic configured by the MAC entity is set to true and the terminal satisfies a condition for uplink transmission skipping.

For example, the x bits (where x is a natural number, and may be equal to 1) and an existing 1-bit UL-SCH indicator field are jointly encoded into an (x+1)-bit UCI multiplexing field. For the jointly encoded field, code points and meanings are defined in the following table:

| UCI Multiplexing field | Description |
|---|---|
| 00 | UL-SCH shall be transmitted on the PUSCH when CSI request is not set to all zeros (UL-SCH shall be transmitted on the PUSCH when CSI request is not set to all zero(s)). |
| 01 | UL-SCH shall always be transmitted on the PUSCH regardless of what conditions and/or scenarios (UL-SCH shall always be transmitted on the PUSCH). |
| 10 | UL-SCH shall not be transmitted on the PUSCH when skipUplinkTxDynamic is set to true and the terminal satisfies the condition for uplink transmission skipping (UL-SCH shall not be transmitted on the PUSCH when skipUplinkTxDynamic is set to true). |
| 11 | Reserved |

In another optional embodiment, the first indication information uses the third indication field in the uplink grant message.

In a case that a value of the third indication field is a sixth value, it indicates that the MAC entity always generates a MAC PDU; and/or
in a case that a value of the third indication field is a seventh value, it indicates that the MAC entity skips generating a MAC PDU when the following conditions are satisfied: skipUplinkTxDynamic is set to true and the terminal satisfies a condition for uplink transmission skipping.

For example, the existing UL-SCH indicator field is given a new meaning. When the value of the UL-SCH indicator field is 0, it indicates that the UL-SCH shall always be transmitted on the PUSCH without conditions (UL-SCH shall always be transmitted on the PUSCH without conditions); or when the value of the UL-SCH indicator field is 1, it indicates that the UL-SCH shall not be transmitted on the PUSCH when skipUplinkTxDynamic is set to true and the terminal meets the condition for skipping uplink transmission (UL-SCH shall not be transmitted on the PUSCH when skipUplinkTxDynamic is set to true).

The condition for uplink transmission skipping includes all of the following:
the value of the parameter skipUplinkTxDynamic configured by the MAC entity is set to true, and the MAC entity successfully locates a HARQ entity indicated in the uplink grant message;
the uplink grant message does not trigger aperiodic CSI reporting;

a resource allocated by using the uplink grant message does not overlap that of to-be-transmitted uplink control signaling in time domain;

the MAC PDU includes 0 MAC service data units SDUs; and the MAC PDU includes only a periodic buffer status report BSR and there is no data available for any logical channel group, or the MAC PDU includes only a padding BSR.

It should be noted that the uplink grant message is demodulated by the physical layer entity and then sent to the MAC entity.

In addition, if the MAC entity generates a MAC PDU, in a case that the scheduled PUSCH is configured or indicated by the uplink grant message to implement K repetition transmissions, the MAC entity correspondingly generates a plurality of repeated MAC PDUs, where K is an integer greater than or equal to 1.

In some embodiments, inter-layer signaling, that is, the second indication information, between the physical layer and the MAC layer of the terminal is defined. When the physical layer entity determines that the scheduled physical uplink shared channel PUSCH and the physical uplink control channel PUCCH have an overlapping resource in time domain, the physical layer entity sends the second indication information to the MAC entity.

In an optional embodiment, the second indication information may indicate that if the value of the parameter skipUplinkTxDynamic configured by the MAC entity is set to true, the MAC entity always generates a MAC PDU.

In another optional embodiment, the second indication information may alternatively indicate that if all the following conditions are satisfied, the MAC entity does not generate a MAC PDU for the HARQ entity:

the parameter skipUplinkTxDynamic of the MAC entity is set to true and the grant indicated to the HARQ entity is addressed to a C-RNTI, or the grant indicated to the HARQ entity is a configured uplink grant (the MAC entity is configured with skipUplinkTxDynamic with value true and the grant indicated to the HARQ entity was addressed to a C-RNTI, or the grant indicated to the HARQ entity is a configured uplink grant);

there is no aperiodic CSI requested for this PUSCH transmission (there is no aperiodic CSI requested for this PUSCH transmission);

a notification of "UCI multiplexing" (or "UL-SCH generation") or "UCI multiplexing" (or "UL-SCH") has not been received from lower layers (if the notification of "UCI multiplexing" (or "UL-SCH generation") "UCI multiplexing" (or "UL-SCH") has not been received from lower layers);

the MAC PDU includes 0 MAC service data units SDUs (the MAC PDU includes zero MAC SDUs); and the MAC PDU includes only a periodic BSR and there is no data available for any logical channel group, or the MAC PDU includes only a padding BSR (the MAC PDU includes only the periodic BSR and there is no data available for any LCG, or the MAC PDU includes only the padding BSR).

If the MAC entity generates a MAC PDU, in a case that the scheduled PUSCH is configured or indicated by the uplink grant message to implement K repetition transmissions, internal signaling delivered by the physical layer entity to the MAC entity may be:

unconditionally generating K identical MAC PDUs; or unconditionally generating M MAC PDUs in K MAC PDUs, where 1≤M≤K, M is the number of overlapping resources between the PUCCH and the PUSCH, K is an integer greater than or equal to 1, and M is an integer greater than or equal to 1 and less than or equal to K.

The MAC entity may generate K or M repeated MAC PDUs according to the second indication information.

In addition, if a repetition transmission type is B, repetition of the MAC PDU is a nominal repetition transmission or the first or last actual repetition transmission that overlaps the PUCCH resource.

In some embodiments, there is no need to define any air interface signaling or internal signaling of the terminal, and a related MAC PDU generation condition is directly defined at the MAC layer, so that overlapping of the physical layer PUCCH and PUSCH transmission resources is visible to the MAC layer. For example, the configuration of the terminal is that the MAC entity generates a MAC PDU in a case that none of conditions for uplink transmission skipping is satisfied.

In an optional embodiment, the condition for uplink transmission skipping includes all of the following:

the value of the parameter skipUplinkTxDynamic configured by the MAC entity is set to true, and the MAC entity successfully locates a HARQ entity indicated in the uplink grant message;

the uplink grant message does not trigger aperiodic CSI reporting;

a resource allocated by using the uplink grant message does not overlap that of to-be-transmitted uplink control signaling in time domain;

the MAC PDU includes 0 MAC service data units SDUs; and the MAC PDU includes only a periodic buffer status report BSR and there is no data available for any logical channel group, or the MAC PDU includes only a padding BSR.

If all of the foregoing conditions are satisfied, the MAC entity may not generate a MAC PDU for the HARQ entity, or if none of the foregoing conditions is satisfied, the MAC entity may generate a MAC PDU.

In addition, if the MAC entity generates a MAC PDU, in a case that the scheduled PUSCH is configured or indicated by the uplink grant message to implement K repetition transmissions, the MAC entity generates a plurality of repeated MAC PDUs, where K is an integer greater than or equal to 1.

An embodiment of this application provides a configuration method for protocol data unit generation, applied to a network-side device. As shown in FIG. 7, the method includes:

Step 201: Send first indication information to a terminal, so as to indicate that a media access control MAC entity of the terminal generates a MAC protocol data unit PDU for a currently scheduled hybrid automatic repeat request HARQ entity.

The first indication information sent by the network-side device is dynamic scheduling information, and can clearly indicate under what conditions an UL-SCH is generated, or indicate whether to generate an UL-SCH, or indicate whether uplink data needs be generated regardless of whether the terminal has data or not. Generating the UL-SCH means generating a MAC PDU by the MAC entity.

In some embodiments, the first indication information may be carried in an uplink grant message sent by the network-side device. For example, x bits (x is a natural number and may be equal to 1) are introduced into a DCI format(s), that is, the UL grant, and is used to indicate whether an UL-SCH (data) is generated for this PUSCH transmission.

In some embodiments, the first indication information occupies an independent first indication field in the uplink grant message; or the first indication information and other indication information are jointly encoded to occupy a second indication field in the uplink grant message; or the first indication information uses a third indication field, used for indicating other information, in the uplink grant message.

That is, the x bits may occupy an independent field in the UL grant, or may be jointly encoded with an existing field, or may use an existing field.

In an optional embodiment, the first indication information occupies an independent first indication field in the uplink grant message.

In a case that a value of the first indication field is a first value, it indicates that the MAC entity always generates a MAC PDU; and/or in a case that a value of the first indication field is a second value, it indicates that the MAC entity skips generating a MAC PDU when the following conditions are satisfied: a value of a parameter skipUplinkTxDynamic configured by the MAC entity is set to true and the terminal satisfies a condition for uplink transmission skipping.

The independent first indication field may be a UCI multiplexing field with a size of 1 bit.

In an optional example, when a value of the UCI multiplexing field is 1, it indicates that the terminal always sends the UL-SCH on the PUSCH regardless of what conditions and scenarios; or when the value of the UCI multiplexing field is 0, it is a reserved value.

In another optional example, when a value of the UCI multiplexing field is 1, it indicates that the terminal always sends the UL-SCH on the PUSCH regardless of what conditions and scenarios; or when a value of the UCI multiplexing field is 0, it indicates that an UL-SCH is not generated when the following conditions are satisfied: skipUplinkTxDynamic is set to true and a condition for uplink transmission skipping (UL skipping) by the terminal is satisfied.

The condition for uplink transmission skipping to be implemented by the terminal includes all of the following:

the value of the parameter skipUplinkTxDynamic configured by the MAC entity is set to true, and the MAC entity successfully locates a HARQ entity indicated in the uplink grant message;

the uplink grant message does not trigger aperiodic CSI reporting;

a resource allocated by using the uplink grant message does not overlap that of to-be-transmitted uplink control signaling in time domain;

the MAC PDU includes 0 MAC service data units SDUs; and the MAC PDU includes only a periodic buffer status report BSR and there is no data available for any logical channel group, or the MAC PDU includes only a padding BSR.

In another optional embodiment, the first indication information and other indication information are jointly encoded to occupy a second indication field in the uplink grant message.

In a case that a value of the second indication field is a third value, it indicates that the MAC entity generates a MAC PDU when a channel state information CSI request is not set to all zeros;

in a case that the value of the second indication field is a fourth value, it indicates that the MAC entity always generates a MAC PDU; and in a case that the value of the second indication field is a fifth value, it indicates that the MAC entity skips generating a MAC PDU when a value of a parameter skipUplinkTxDynamic configured by the MAC entity is set to true and the terminal satisfies a condition for uplink transmission skipping.

For example, the x bits (where x is a natural number, and may be equal to 1) and an existing 1-bit UL-SCH indicator field are jointly encoded into an (x+1)-bit UCI multiplexing field. For the jointly encoded field, code points and meanings are defined in the following table:

| UCI Multiplexing field | Description |
| --- | --- |
| 00 | UL-SCH shall be transmitted on the PUSCH when CSI request is not set to all zeros (UL-SCH shall be transmitted on the PUSCH when CSI request is not set to all zero(s)). |
| 01 | UL-SCH shall always be transmitted on the PUSCH regardless of what conditions and/or scenarios (UL-SCH shall always be transmitted on the PUSCH). |
| 10 | UL-SCH shall not be transmitted on the PUSCH when skipUplinkTxDynamic is set to true and the terminal satisfies the condition for uplink transmission skipping (UL-SCH shall not be transmitted on the PUSCH when skipUplinkTxDynamic is set to true). |
| 11 | Reserved |

In another optional embodiment, the first indication information uses the third indication field in the uplink grant message.

In a case that a value of the third indication field is a sixth value, it indicates that the MAC entity always generates a MAC PDU; and/or in a case that a value of the third indication field is a seventh value, it indicates that the MAC entity skips generating a MAC PDU when the following conditions are satisfied: skipUplinkTxDynamic is set to true and the terminal satisfies a condition for uplink transmission skipping.

For example, the existing UL-SCH indicator field is given a new meaning. When the value of the UL-SCH indicator field is 0, it indicates that the UL-SCH shall always be transmitted on the PUSCH without conditions (UL-SCH shall always be transmitted on the PUSCH without conditions); or when the value of the UL-SCH indicator field is 1, it indicates that the UL-SCH shall not be transmitted on the PUSCH when skipUplinkTxDynamic is set to true and the terminal meets the condition for skipping uplink transmission (UL-SCH shall not be transmitted on the PUSCH when skipUplinkTxDynamic is set to true).

The condition for uplink transmission skipping includes all of the following:

the value of the parameter skipUplinkTxDynamic configured by the MAC entity is set to true, and the MAC entity successfully locates a HARQ entity indicated in the uplink grant message;

the uplink grant message does not trigger aperiodic CSI reporting;

a resource allocated by using the uplink grant message does not overlap that of to-be-transmitted uplink control signaling in time domain;

the MAC PDU includes 0 MAC service data units SDUs; and the MAC PDU includes only a periodic buffer status report BSR and there is no data available for any logical channel group, or the MAC PDU includes only a padding BSR.

It should be noted that the uplink grant message is demodulated by the physical layer entity and then sent to the MAC entity.

In addition, if the MAC entity generates a MAC PDU, in a case that the scheduled PUSCH is configured or indicated by the uplink grant message to implement K repetition transmissions, the MAC entity correspondingly generates a plurality of repeated MAC PDUs, where K is an integer greater than or equal to 1.

The technical solutions of this application are further described below with reference to the accompanying drawings and optional embodiments.

Embodiment 1

Figure 8:
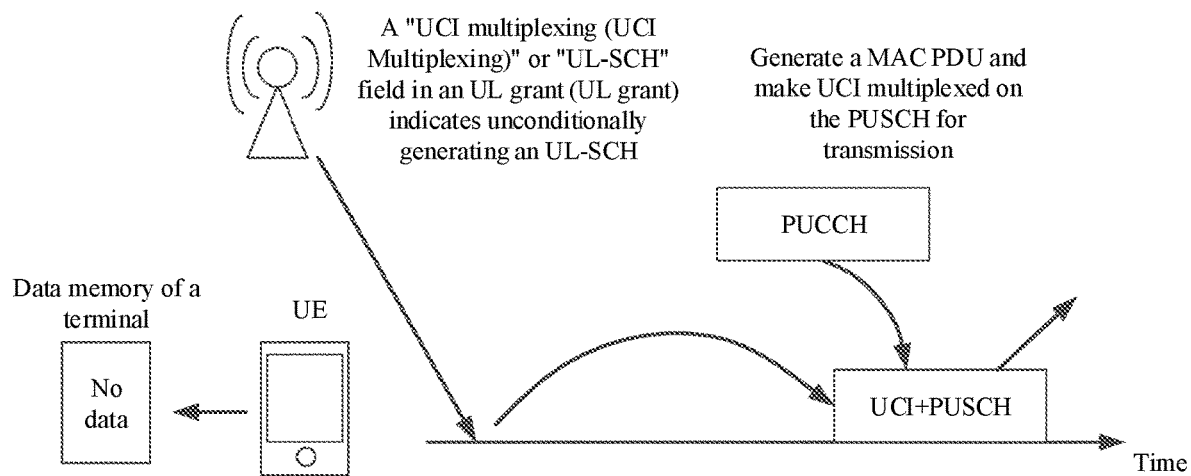
FIG. 8 is a schematic diagram of a MAC entity generating a MAC PDU to support UCI multiplexing on PUSCH according to an embodiment of this application.

In this embodiment, as shown in FIG. 8, on the base station and/or the network side, if skipUplinkTxDynamic with a value of true is configured on the network side, and a scheduled PUSCH resource and a PUCCH resource overlap in time, in order to reduce complexity of blind detection (that is, determining whether the UCI is transmitted on the PUCCH or on the PUSCH), the network side needs to indicate by using a related field as defined above in the UL grant that the UL-SCH is always transmitted on the PUSCH regardless of what conditions and scenarios.

On the terminal and/or user side, the physical layer entity of the terminal demodulates the UL grant, and delivers information received in the UL grant to the MAC entity, and the MAC entity of the terminal determines, based on the foregoing defined field in the UL grant, whether to generate a MAC PDU. That is, if all of the following conditions are satisfied, the MAC entity does not generate a MAC PDU for the HARQ entity:

the parameter skipUplinkTxDynamic of the MAC entity is set to true and the grant indicated to the HARQ entity is addressed to a C-RNTI, or the grant indicated to the HARQ entity is a configured uplink grant (the MAC entity is configured with skipUplinkTxDynamic with value true and the grant indicated to the HARQ entity was addressed to a C-RNTI, or the grant indicated to the HARQ entity is a configured uplink grant);

there is no aperiodic CSI requested for this PUSCH transmission (there is no aperiodic CSI requested for this PUSCH transmission);

there is no "UCI multiplexing" (or "UL-SCH") requested for this PUSCH transmission (there is no "UCI multiplexing" (or "UL-SCH") requested for this PUSCH transmission);

the MAC PDU includes 0 MAC service data units SDUs (the MAC PDU includes zero MAC SDUs); and the MAC PDU includes only a periodic BSR and there is no data available for any logical channel group, or the MAC PDU includes only a padding BSR (the MAC PDU includes only the periodic BSR and there is no data available for any LCG, or the MAC PDU includes only the padding BSR).

Embodiment 2

Figure 9:
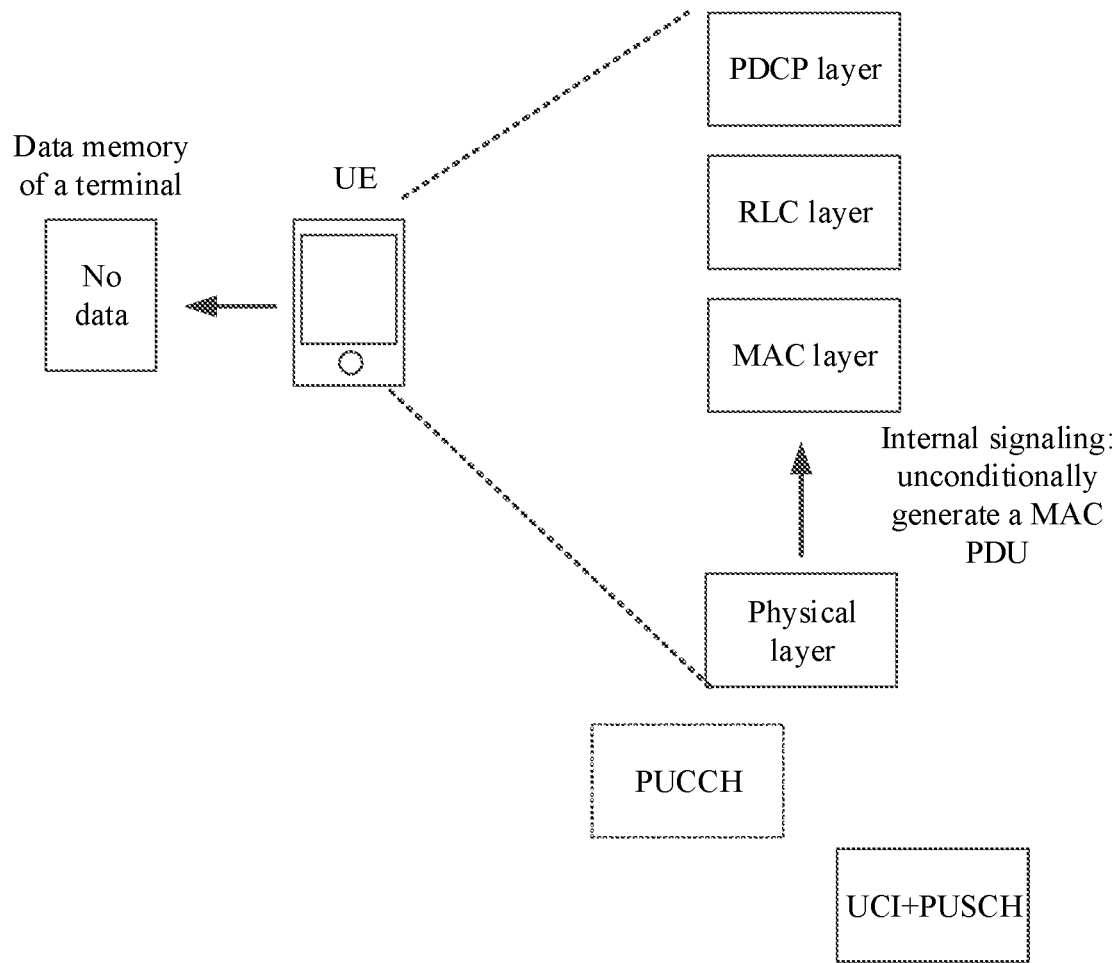
FIG. 9 is a schematic diagram of a physical layer generating internal signaling to indicate a MAC entity to unconditionally generate a MAC PDU according to an embodiment of this application.

In this embodiment, as shown in FIG. 9, inter-layer signaling between the physical layer and the MAC layer of the terminal is defined. When the physical layer of the terminal realizes that the scheduled PUSCH resource and the PUCCH resource overlap in the time domain, and optionally, skipUplinkTxDynamic with a value of true is configured for the terminal, the physical layer of the terminal may notify the MAC layer to unconditionally generate a MAC PDU for the currently scheduled HARQ entity.

It should be noted that, in the protocol data unit generation method provided in the embodiments of this application, the execution subject may be a protocol data unit generation apparatus, or a module for executing the protocol data unit generation method in the protocol data unit generation apparatus. In this embodiment of this application, the protocol data unit generation method provided in the embodiments of this application is described by using the protocol data unit generation method being executed by the protocol data unit generation apparatus as an example.

Figure 10:
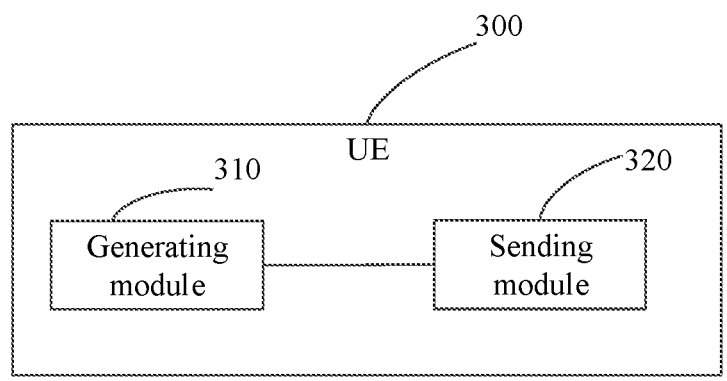
FIG. 10 is a structural block diagram of a protocol data unit generation apparatus according to an embodiment of this application.

The protocol data unit generation apparatus in this embodiment of this application is applied to a terminal 300. As shown in FIG. 10, the apparatus includes:

a generating module 310, configured to generate a MAC protocol data unit PDU for a currently scheduled hybrid automatic repeat request HARQ entity according to at least one of the following: first indication information sent by a network-side device, second indication information sent by a physical layer entity to the MAC entity, or a configuration of the terminal; and a sending module 320, configured to send the generated MAC PDU to the physical layer entity.

In some embodiments, the first indication information occupies an independent first indication field in the uplink grant message; or the first indication information and other indication information are jointly encoded to occupy a second indication field in the uplink grant message; or the first indication information uses a third indication field, used for indicating other information, in the uplink grant message.

In some embodiments, the configuration of the terminal is that the MAC entity generates a MAC PDU in a case that none of conditions for uplink transmission skipping is satisfied.

In some embodiments, the second indication information is sent in a case that the physical layer entity determines that resources of a scheduled physical uplink shared channel PUSCH and a physical uplink control channel PUCCH overlap in time domain.

The protocol data unit generation apparatus in this embodiment of this application may be an apparatus, or may be a component, an integrated circuit, or a chip in the terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (personal digital assistant, PDA), or the like. The non-mobile electronic device may be a network-attached storage (NAS), a personal computer (PC), a television (TV), a teller machine, a self-service machine, or the like. This is not specifically limited in the embodiments of this application.

The protocol data unit generation apparatus in this embodiment of this application may be an apparatus with an operating system. The operating system may be an Android operating system, an iOS operating system, or other possible operating systems, and is not specifically limited in the embodiments of this application.

The protocol data unit generation apparatus provided in this embodiment of this application is capable of implementing the processes that are implemented by using the protocol data unit generation method in the method embodiment of FIG. 6. To avoid repetition, details are not described herein again.

It should be noted that, in the configuration method for protocol data unit generation provided in the embodiments of this application, the execution subject may be a configuration apparatus for protocol data unit generation, or a module for executing the configuration method for protocol data unit generation in the configuration apparatus for protocol data unit generation. In this embodiment of this application, the configuration method for protocol data unit generation provided in the embodiments of this application is described by using the configuration method for protocol data unit generation being executed by the configuration apparatus for protocol data unit generation as an example.

Figure 11:
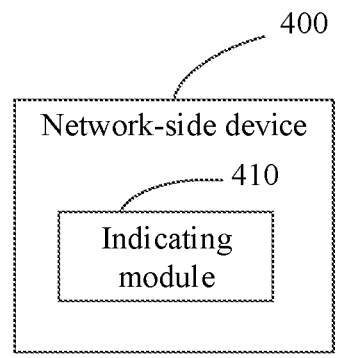
FIG. 11 is a structural block diagram of a configuration apparatus for protocol data unit generation according to an embodiment of this application.

The configuration apparatus for protocol data unit generation in this embodiment of this application is applied to a network-side device 400. As shown in FIG. 11, the apparatus includes:

an indicating module 410, configured to send first indication information to a terminal, so as to indicate that a media access control MAC entity of the terminal generates a MAC protocol data unit PDU for a currently scheduled hybrid automatic repeat request HARQ entity.

In some embodiments, the first indication information occupies an independent first indication field in the uplink grant message; or the first indication information and other indication information are jointly encoded to occupy a second indication field in the uplink grant message; or the first indication information uses a third indication field, used for indicating other information, in the uplink grant message.

The configuration apparatus for protocol data unit generation in this embodiment of this application may be an apparatus, or may be a component, an integrated circuit, or a chip in a network-side device. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a network-attached storage (NAS), a personal computer (PC), a television (TV), a teller machine, a self-service machine, or the like. This is not specifically limited in the embodiments of this application.

The configuration apparatus for protocol data unit generation in this embodiment of this application may be an apparatus with an operating system. The operating system may be an Android operating system, an iOS operating system, or other possible operating systems, and is not specifically limited in the embodiments of this application.

The configuration apparatus for protocol data unit generation provided in this embodiment of this application is capable of implementing the processes that are implemented by using the configuration method for protocol data unit generation in the method embodiment of FIG. 7. To avoid repetition, details are not described herein again.

Optionally, an embodiment of this application further provides an electronic device, including a processor, a memory, and a program or an instruction stored in the memory and capable of running on the processor. When the program or the instruction is executed by the processor, the processes of the foregoing embodiments of the configuration method for protocol data unit generation or the protocol data unit generation method are implemented, with the same technical effects achieved. To avoid repetition, details are not described herein again.

It should be noted that the electronic device in this embodiment of this application includes the aforementioned mobile electronic device and non-mobile electronic device.

Figure 12:
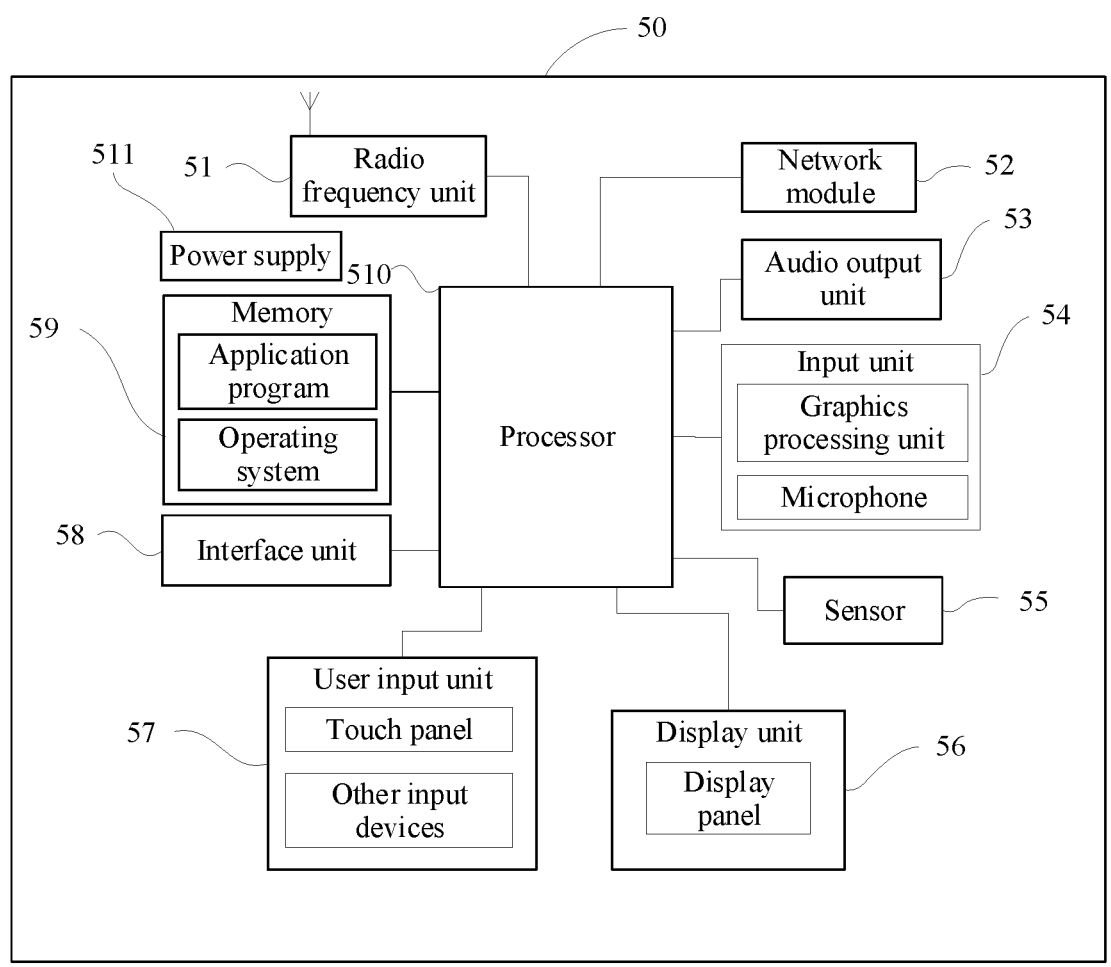
FIG. 12 is a block diagram of a terminal according to an embodiment of this application.

The electronic device in this embodiment may be a terminal. FIG. 12 is a schematic structural diagram of hardware of a terminal according to the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. A person skilled in the art may understand that the structure of the terminal shown in FIG. 12 does not constitute any limitation on the terminal. The terminal may include more or fewer components than shown in the figure, or a combination of some components, or the components disposed differently. In this embodiment of this application, the terminal includes, but is not limited to, a mobile phone, a tablet computer, a laptop computer, a personal digital assistant, an in-vehicle terminal, a wearable device, a pedometer, and the like.

It should be understood that in this embodiment of this application, the radio frequency unit 51 may be configured to receive and send information, or to receive and send a signal in a call process, and specially, after receiving downlink data from a base station, send the downlink data to the processor 510 for processing; and also send uplink data to the base station. Generally, the radio frequency unit 51 includes but is not limited to an antenna, at least one amplifier, a transceiver, a coupler, a low noise amplifier, a duplexer, and the like. In addition, the radio frequency unit 51 may also communicate with a network and other devices via a wireless communications system.

The memory 59 may be configured to store software programs and various data. The memory 59 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 59 may include a high-speed random access memory, and may further include a non-volatile memory such as a disk storage device, a flash memory device, or another volatile solid-state storage device.

The processor 510 is a control center of the terminal, and is connected to all components of the terminal by using various interfaces and lines. By running or executing a software program and/or module that is stored in the memory 59 and calling data stored in the memory 59, the processor 510 executes various functions of the terminal and processes data, so as to perform overall monitoring on the terminal. The processor 510 may include one or more processing units. Optionally, an application processor and a modem processor may be integrated in the processor 510. The application processor primarily processes an operating system, user interfaces, application programs, and the like. The modem processor primarily processes radio communication. It can be understood that the modem processor may alternatively be not integrated in the processor 510.

The terminal 50 may further include the power supply 511 (such as a battery) supplying power to each component. Optionally, the power supply 511 may be logically connected to the processor 510 by using a power management system, so that functions such as charge and discharge management and power consumption management are implemented by using the power management system.

In addition, the terminal 50 includes some functional modules that are not illustrated. Details are not described herein.

Figure 13:
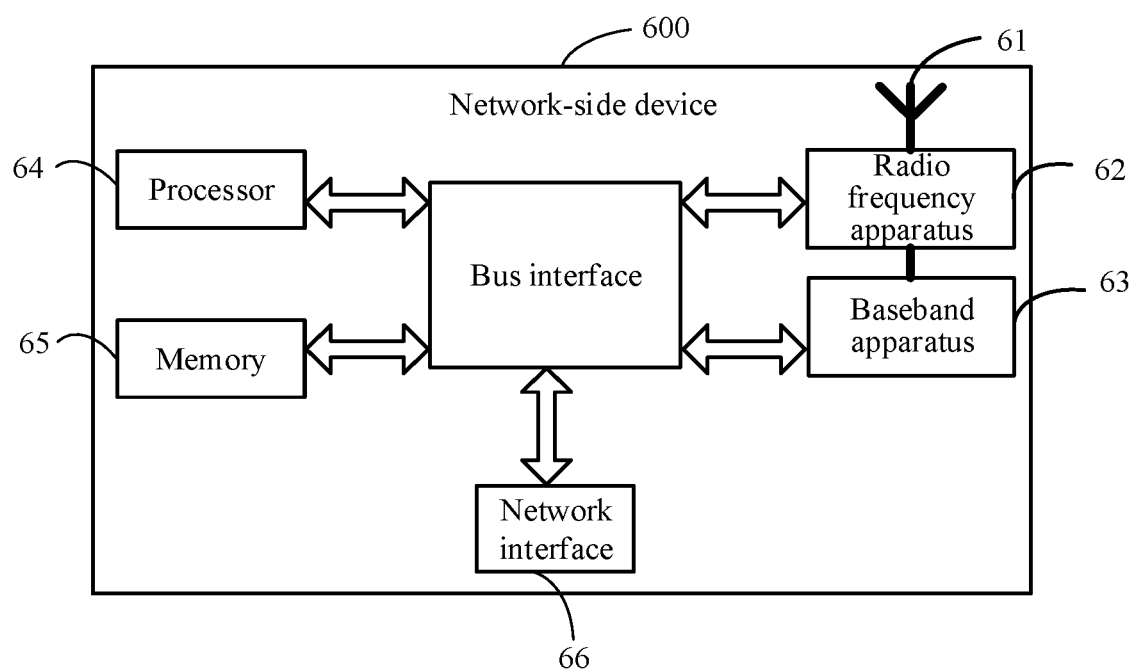
FIG. 13 is a block diagram of a network-side device according to an embodiment of this application.

The electronic device in this embodiment may alternatively be a network-side device. As shown in FIG. 13, the network-side device 600 includes an antenna 61, a radio frequency apparatus 62, and a baseband apparatus 63. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes to-be-sent information, and sends the information to the radio frequency apparatus 62; and the radio frequency apparatus 62 processes the received information and then sends the information out by using the antenna 61.

The frequency band processing apparatus may be located in the baseband apparatus 63. The method performed by the network-side device in the foregoing embodiments may be implemented in the baseband apparatus 63, and the baseband apparatus 63 includes a processor 64 and a memory 65.

The baseband apparatus 63 may include, for example, at least one baseband processing unit, where a plurality of chips are disposed on the baseband processing unit. As shown in FIG. 13, one of the chips is, for example, the processor 64, connected to the memory 65, to invoke a program in the memory 65 to perform the operation of the network-side device shown in the foregoing method embodiment.

The baseband apparatus 63 may further include a network interface 66, configured to exchange information with the radio frequency apparatus 62, where the interface is, for example, a common public radio interface (CPRI).

Herein, the processor may be one processor, or may be a collective term for a plurality of processing components. For example, the processor may be a CPU, or may be an ASIC, or is configured as one or more integrated circuits for implementing the method performed by the network-side device, for example, one or more microprocessors DSPs, or one or more field programmable gate arrays FPGAs. A storage component may be a memory, or may be a collective term for a plurality of storage components.

The memory 65 may be a volatile memory or a non-volatile memory, or may include a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), which is used as an external cache. As illustrative rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 65 described in this application is intended to include but is not limited to these and any other suitable types of memories.

An embodiment of this application further provides a readable storage medium, where a program or an instruction is stored in the readable storage medium. When the program or the instruction is executed by a processor, the processes of the foregoing embodiments of the configuration method for protocol data unit generation or the protocol data unit generation method are implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or an instruction to implement the processes of the foregoing embodiments of the configuration method for protocol data unit generation or the protocol data unit generation method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A protocol data unit generation method, performed by a terminal, wherein the method comprises:
    generating, by a media access control (MAC) entity of the terminal, a MAC protocol data unit (PDU) for a currently scheduled hybrid automatic repeat request (HARQ) entity according to a configuration of the terminal; and
    sending, by the MAC entity, the generated MAC PDU to the physical layer entity,
    wherein the configuration of the terminal is that the MAC entity generates a MAC PDU in a case that none of conditions for uplink transmission skipping is satisfied;
    wherein the conditions for uplink transmission skipping comprises all of the following:
    the value of the parameter skipUplinkTxDynamic configured by the MAC entity is set to true, and the MAC entity successfully locates a HARQ entity indicated in the uplink grant message;
    the uplink grant message does not trigger aperiodic CSI reporting;
    a resource allocated by using the uplink grant message does not overlap that of to-be-transmitted uplink control signalling in time domain;
    the MAC PDU comprises 0 MAC service data unit (SDU), and
    the MAC PDU comprises only a periodic buffer status report (BSR) and there is no data available for any logical channel group, or the MAC PDU comprises only a padding BSR.

2. The protocol data unit generation method according to claim 1, wherein the method further comprises:
    generating, by the MAC entity of the terminal, the MAC PDU for the currently scheduled HARQ entity according to first indication information; wherein
    the first indication information is carried in an uplink grant message sent by the network-side device.

3. The protocol data unit generation method according to claim 2, wherein
    the first indication information occupies an independent first indication field in the uplink grant message; or
    the first indication information and other indication information are jointly encoded to occupy a second indication field in the uplink grant message; or
    the first indication information uses a third indication field, used for indicating other information, in the uplink grant message.

4. The protocol data unit generation method according to claim 3, wherein if the first indication information occupies the independent first indication field in the uplink grant message,
    in a case that a value of the first indication field is a first value, it indicates that the MAC entity always generates a MAC PDU; and/or
    in a case that a value of the first indication field is a second value, it indicates that the MAC entity skips generating a MAC PDU when the following conditions are satisfied: a value of a parameter skipUplinkTxDynamic configured by the MAC entity is set to true and the terminal satisfies the conditions for uplink transmission skipping;
    or
    wherein if the first indication information and other indication information are jointly encoded to occupy the second indication field in the uplink grant message,
    in a case that a value of the second indication field is a third value, it indicates that the MAC entity generates a MAC PDU when a channel state information (CSI) request is not set to all zeros;
    in a case that the value of the second indication field is a fourth value, it indicates that the MAC entity always generates a MAC PDU; and
    in a case that the value of the second indication field is a fifth value, it indicates that the MAC entity skips generating a MAC PDU when a value of a parameter skipUplinkTxDynamic configured by the MAC entity is set to true and the terminal satisfies the conditions for uplink transmission skipping;
    or
    wherein if the first indication information uses the third indication field in the uplink grant message,
    in a case that a value of the third indication field is a sixth value, it indicates that the MAC entity always generates a MAC PDU; and/or
    in a case that a value of the third indication field is a seventh value, it indicates that the MAC entity skips generating a MAC PDU when the following conditions are satisfied: skipUplinkTxDynamic is set to true and the terminal satisfies the conditions for uplink transmission skipping.

5. The protocol data unit generation method according to claim 2, wherein the uplink grant message is demodulated by the physical layer entity and sent to the MAC entity.

6. The protocol data unit generation method according to claim 2, wherein if the MAC entity generates a MAC PDU, in a case that a scheduled PUSCH is configured or indicated by the uplink grant message to implement K repetition transmissions, the MAC entity generates a plurality of repeated MAC PDUs, wherein K is an integer greater than or equal to 1.

7. A configuration method for protocol data unit generation, performed by a network-side device, wherein the method comprises:
    sending first indication information to a terminal, so as to indicate that a media access control (MAC) entity of the terminal generates a MAC protocol data unit (PDU) for a currently scheduled hybrid automatic repeat request (HARQ) entity;
    wherein the first indication information is carried in an uplink grant message sent by the network-side device;
    the first indication information occupies an independent first indication field in the uplink grant message; or the first indication information and other indication information are jointly encoder to occupy a second indication field in the uplink grant message, or the first indication information uses a third indication field, used for indicating other information, in the uplink grant message;

wherein if the first indication information occupies the independent first indication field in the uplink grant message, in a case that a value of the first indication field is a first value, it indicates that the MAC entity always generates a MAC PDU; and/or in a case that a value of the first indication field is a second value, it indicates that the MAC entity skips generating a MAC PDU when the following conditions are satisfied: a value of a parameter skipUplinkTxDynamic configured by the MAC entity is set to true and the terminal satisfies the conditions for uplink transmission skipping;

or wherein if the first indication information and other indication information are jointly encoded to occupy the second indication field in the uplink grant message, in a case that a value of the second indication field is a third value, it indicates that the MAC entity generates a MAC PDU when a channel state information (CSI) request is not set to all zeros;

in a case that the value of the second indication field is a fourth value, it indicates that the MAC entity always generates a MAC PDU; and in a case that the value of the second indication field is a fifth value, it indicates that the MAC entity skips generating a MAC PDU when a value of a parameter skipUplinkTxDynamic configured by the MAC entity is set to true and the terminal satisfies the conditions for uplink transmission skipping;

wherein if the first indication information uses the third indication field in the uplink grant message, in a case that a value of the third indication field is a sixth value, it indicates that the MAC entity always generates a MAC PDU; and/or in a case that a value of the third indication field is a seventh value, it indicates that the MAC entity skips generating a MAC PDU when the following conditions are satisfied: skipUplinkTxDynamic is set to true and the terminal satisfies the conditions for uplink transmission skipping;

wherein the conditions for uplink transmission skipping comprises all of the following:

the value of the parameter skipUplinkTxDynamic configured by the MAC entity is set to true, and the MAC entity successfully locates a HARQ entity indicated in the uplink grant message;

the uplink grant message does not trigger aperiodic CSI reporting;

a resource allocated by using the uplink grant message does not overlap that of to-be-transmitted uplink control signaling in time domain;

the MAC PDU comprises 0 MAC service data unit (SDU), and the MAC PDU comprises only a periodic buffer status report (BSR) and there is no data available for any logical channel group, or the MAC PDU comprises only a padding BSR.

8. An electronic device, comprising a processor, a memory, and an instruction stored in the memory and capable of running on the processor, wherein when the instruction is executed by the processor, steps of the method according to claim 7 are implemented.

9. An electronic device, comprising a processor, a memory, and an instruction stored in the memory and capable of running on the processor, wherein when the instruction is executed by the processor, steps of a protocol data unit generation method are implemented, wherein the steps comprises:

generating, by a media access control (MAC) entity of the terminal, a MAC protocol data unit (PDU) for a currently scheduled hybrid automatic repeat request (HARQ) entity according to a configuration of the terminal; and sending, by the MAC entity, the generated MAC PDU to the physical layer entity, wherein the configuration of the terminal is that the MAC entity generates a MAC PDU in a case that none of conditions for uplink transmission skipping is satisfied;

wherein the conditions for uplink transmission skipping comprises all of the following:

the value of the parameter skipUplinkTxDynamic configured by the MAC entity is set to true, and the MAC entity successfully locates a HARQ entity indicated in the uplink grant message;

the uplink grant message does not trigger aperiodic CSI reporting;

a resource allocated by using the uplink grant message does not overlap that of to-be-transmitted uplink control signaling in time domain;

the MAC PDU comprises 0 MAC service data unit (SDU); and the MAC PDU comprises only a periodic buffer status report (BSR) and there is no data available for any logical channel group, or the MAC PDU comprises only a padding BSR.

10. The electronic device according to claim 9, wherein the steps further comprise:

generating, by the MAC entity of the terminal, the MAC PDU for the currently scheduled HARQ entity according to the configuration of the terminal and first indication information; wherein the first indication information occupies an independent first indication field in an uplink grant message; or the first indication information and other indication information are jointly encoded to occupy a second indication field in the uplink grant message; or the first indication information uses a third indication field, used for indicating other information, in the uplink grant message.

11. The electronic device according to claim 10, wherein if the first indication information occupies the independent first indication field in the uplink grant message, in a case that a value of the first indication field is a first value, it indicates that the MAC entity always generates a MAC PDU; and/or in a case that a value of the first indication field is a second value, it indicates that the MAC entity skips generating a MAC PDU when the following conditions are satisfied: a value of a parameter skipUplinkTxDynamic configured by the MAC entity is set to true and the terminal satisfies the conditions for uplink transmission skipping;

or wherein if the first indication information and other indication information are jointly encoded to occupy the second indication field in the uplink grant message, in a case that a value of the second indication field is a third value, it indicates that the MAC entity generates a MAC PDU when a channel state information (CSI) request is not set to all zeros;

in a case that the value of the second indication field is a fourth value, it indicates that the MAC entity always generates a MAC PDU; and in a case that the value of the second indication field is a fifth value, it indicates that the MAC entity skips generating a MAC PDU when a value of a parameter skipUplinkTxDynamic configured by the MAC entity is set to true and the terminal satisfies the conditions for uplink transmission skipping;

or wherein if the first indication information uses the third indication field in the uplink grant message, in a case that a value of the third indication field is a sixth value, it indicates that the MAC entity always generates a MAC PDU; and/or in a case that a value of the third indication field is a seventh value, it indicates that the MAC entity skips generating a MAC PDU when the following conditions are satisfied: skipUplinkTxDynamic is set to true and the terminal satisfies the conditions for uplink transmission skipping.

12. The electronic device according to claim 9, wherein the first indication information is carried in an uplink grant message sent by the network-side device.

13. The electronic device according to claim 12, wherein the uplink grant message is demodulated by the physical layer entity and sent to the MAC entity.

14. The electronic device according to claim 12, wherein if the MAC entity generates a MAC PDU, in a case that a scheduled PUSCH is configured or indicated by the uplink grant message to implement K repetition transmissions, the MAC entity generates a plurality of repeated MAC PDUs, wherein K is an integer greater than or equal to 1.

* * * * *